United States Patent
Cooper et al.

(10) Patent No.: US 10,967,892 B2
(45) Date of Patent: Apr. 6, 2021

(54) INDEPENDENT CART SYSTEM AND METHOD OF OPERATING THE SAME

(71) Applicant: Rockwell Automation Technologies, Inc., Mayfield Heights, OH (US)

(72) Inventors: Mark R. Cooper, Eden Prairie, MN (US); David D. Van Dorpe, Eden Prairie, MN (US); Patrick E. Ozimek, Mequon, WI (US); Shankernarayan Ramanarayanan, Eden Prairie, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 234 days.

(21) Appl. No.: 16/184,389

(22) Filed: Nov. 8, 2018

(65) Prior Publication Data

US 2020/0148239 A1 May 14, 2020

(51) Int. Cl.
*B61L 23/14* (2006.01)
*B61C 3/00* (2006.01)
*B61L 25/04* (2006.01)
*G05D 1/00* (2006.01)
*G05D 1/02* (2020.01)

(52) U.S. Cl.
CPC ............... *B61L 23/14* (2013.01); *B61C 3/00* (2013.01); *B61L 25/04* (2013.01); *G05D 1/0088* (2013.01); *G05D 1/0291* (2013.01); *G05D 2201/0216* (2013.01)

(58) Field of Classification Search
CPC ...... G05B 19/4189; G05B 2219/41327; G05B 2219/45054; G05D 2201/0216; G05D 1/0291; G05D 1/0088; B61C 3/00; B61L 23/14
See application file for complete search history.

(56) References Cited

U.S. PATENT DOCUMENTS

| | | | | |
|---|---|---|---|---|
| 6,191,507 B1 * | 2/2001 | Peltier | ..................... | B65G 54/02 310/12.02 |
| 6,637,586 B1 * | 10/2003 | Kuecker | ................... | B65G 1/06 198/774.1 |
| RE39,747 E * | 7/2007 | Peltier | ......................... | 310/12.11 |
| 7,421,193 B2 * | 9/2008 | Kobayashi | ................ | H02P 7/03 318/599 |
| 7,448,327 B2 * | 11/2008 | Thornton | ................ | B60L 13/06 104/282 |

(Continued)

FOREIGN PATENT DOCUMENTS

| WO | 98/50760 A2 | 11/1998 |
|---|---|---|
| WO | 2017/089182 A1 | 6/2017 |

OTHER PUBLICATIONS

Extended European Search Report dated Apr. 14, 2020; Application No. 19208005.9—(7) pages.

*Primary Examiner* — Mussa A Shaawat
(74) *Attorney, Agent, or Firm* — Boyle Fredrickson, SC

(57) ABSTRACT

A method and system for motion control of movers in an independent cart system is disclosed. In one implementation, the independent cart system includes a plurality of track segments, each section having a respective controller. One of the controllers receives a motion command for a plurality of carts, respectively. The controller generates a force command for each of the plurality of carts and transmits the respective commands to the track segments commutating the plurality of carts.

18 Claims, 11 Drawing Sheets

(56) References Cited

U.S. PATENT DOCUMENTS

| | | | | |
|---|---|---|---|---|
| 8,863,669 B2* | 10/2014 | Young | ............ | H02P 25/06 104/292 |
| 9,346,371 B2* | 5/2016 | King | ............ | B65G 19/02 |
| 9,555,977 B2* | 1/2017 | Combs | ............ | B65G 23/08 |
| 9,997,985 B2* | 6/2018 | Prussmeier | ............ | H02K 41/03 |
| 10,261,491 B1* | 4/2019 | Dunham | ............ | G05B 19/298 |
| 2006/0030968 A1* | 2/2006 | Ko | ............ | H01R 27/00 700/213 |
| 2007/0261941 A1* | 11/2007 | Pelak | ............ | B65G 47/261 198/781.05 |
| 2008/0006172 A1* | 1/2008 | Thornton | ............ | B60L 13/03 104/292 |
| 2008/0023302 A1* | 1/2008 | Groom | ............ | B65G 47/268 198/781.06 |
| 2012/0024669 A1* | 2/2012 | Danelski | ............ | B65G 43/08 198/617 |
| 2012/0247925 A1* | 10/2012 | Cooke | ............ | B65G 43/00 198/617 |
| 2014/0320058 A1* | 10/2014 | Takagi | ............ | H02K 41/031 318/632 |
| 2015/0344233 A1* | 12/2015 | Kleinikkink | ............ | G05B 19/414 700/230 |
| 2015/0360581 A1* | 12/2015 | King | ............ | B60L 13/03 104/284 |
| 2016/0139585 A1 | 5/2016 | Hessenauer et al. | | |
| 2016/0214219 A1* | 7/2016 | Subhedar | ............ | A47C 27/05 |
| 2016/0260158 A1* | 9/2016 | High | ............ | A47F 3/08 |
| 2016/0355350 A1* | 12/2016 | Yamamoto | ............ | G05B 19/4189 |
| 2017/0225902 A1* | 8/2017 | Harper | ............ | B60P 1/36 |
| 2017/0229991 A1* | 8/2017 | Huber | ............ | H02P 25/06 |
| 2017/0344009 A1* | 11/2017 | Wernersbach | ............ | G08G 1/00 |
| 2018/0090254 A1* | 3/2018 | Ozimek | ............ | H02K 41/02 |
| 2019/0084781 A1* | 3/2019 | Huang | ............ | G05B 19/4185 |
| 2019/0367290 A1* | 12/2019 | Papsdorf | ............ | B65G 17/002 |
| 2019/0367291 A1* | 12/2019 | Papsdorf | ............ | B65G 23/16 |
| 2020/0317449 A1* | 10/2020 | Baijens | ............ | G06Q 50/28 |

* cited by examiner

INDEPENDENT CART SYSTEM AND METHOD OF OPERATING THE SAME

BACKGROUND INFORMATION

The subject matter disclosed herein relates to independent cart technology (ICT) and, more specifically, to a method and system for motion control of movers in independent cart systems.

An independent cart system (ICS) utilizing movers can be used in a wide variety of processes (e.g. packaging, manufacturing, and machining). ICSs can provide an advantage over conventional conveyor belt systems with enhanced flexibility, extremely high-speed movement, and mechanical simplicity. Successive activation of electric coils establishes a moving electromagnetic field that interacts with magnets of a mover and causes the mover to travel along a track. Sensors may be spaced at fixed positions along the track and/or on the movers to provide information about the position and speed of the movers.

In a typical system, the track forms a closed path over which each mover repeatedly travels. At certain positions along the track other actuators (e.g., part of a robotic system) may interact with each mover. For example, the mover may be stopped at a loading station at which a first actuator places a product on the mover. The mover may then be moved along a process portion of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product. The ICS and the external actuator(s) collectively form an automated transport system.

Historically, a central computer for a motion control system collects and distributes servo control state variables for all movers and track segments in the system. The central computer, referred to by some as a "gateway computer," has connections to a system controller performing coordinated motion and to all of the track segments. The central computer distributes control state variables to the individual track segments for motion control of the movers. Utilizing a central computer results in high costs for small tracks and slow update rates between the central computer and the individual track segments.

Thus, it would be desirable to provide an improved method and system for motion control of movers in ICSs.

BRIEF DESCRIPTION

In embodiments of the invention, an improved method and system for motion control of movers in ICSs includes partitioning servo control commands into motion control commands and force control commands, and separating execution of these functions. The method and system allow a fixed connection to the motion controller but enable distributed control over multiple track segments on a track. Motion control responsibility for all the movers in the ICS are spread over many devices and does not have to be concentrated on one device. The embodiments eliminate the centralized computer as a gateway between the system controller doing coordinated motion and the track segments doing the motion movement. The elimination of the central computer allows for smaller tracks to be more cost effective, but the automated transport system also supports large tracks (e.g., up to 128 movers on 64 segments). The system provides enough computing power to perform motion control, but minimize product cost.

According to one embodiment of the invention, a motion system having an automated independent cart system is disclosed. The automated independent cart system includes a mover having a drive magnet, a first track segment, and a second track segment. The first track segment includes a first plurality of drive coils positioned along a first length of the first track segment, a first drive coupled to the first plurality of drive coils, and a first controller coupled to the first drive. The first controller selectively controls the first drive to energize the first plurality of drive coils for establishing a first electromagnetic field to interact with the drive magnet on the mover for moving the mover along the first track segment. The second track segment includes a second plurality of drive coils positioned along a second length of the second track segment, a second drive coupled to the second plurality of drive coils, and a second controller coupled to the second drive. The second controller selectively controls the second drive to energize the second plurality of drive coils for establishing a second electromagnetic field to interact with the drive magnet for moving the mover along the second track segment. The second controller also receives a position feedback related to a position of the mover and generates a force command based on the position feedback. The first controller selectively controls the first drive and the second controller selectively controls the second drive based on the force command. In some additional embodiments a motion controller generates a motion command, where the force command is further based on the motion command.

According to another embodiment of the invention, a method of controlling operation of a plurality of movers traveling along an automated independent cart system is disclosed. The system including a track having a plurality of track segments, each track segment having a respective controller. The method includes the steps of receiving, at a first controller for a first track segment, a motion command for a first mover; receiving, at the first controller, a position feedback corresponding to a location for the first mover along the track; determining, at the first controller, a force command for the first mover based on the motion command and the position feedback; and generating an excitation field to interact with a magnet of the mover based on the force command. The generating the excitation field can be at the first controller or at a second controller for a second track segment. In additional embodiments, the system further includes a backplane communicatively coupling the respective controllers of the plurality of track segments, and the method further includes communicating the position feedback and the force command over the backplane.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings, in which.

Figure 1:
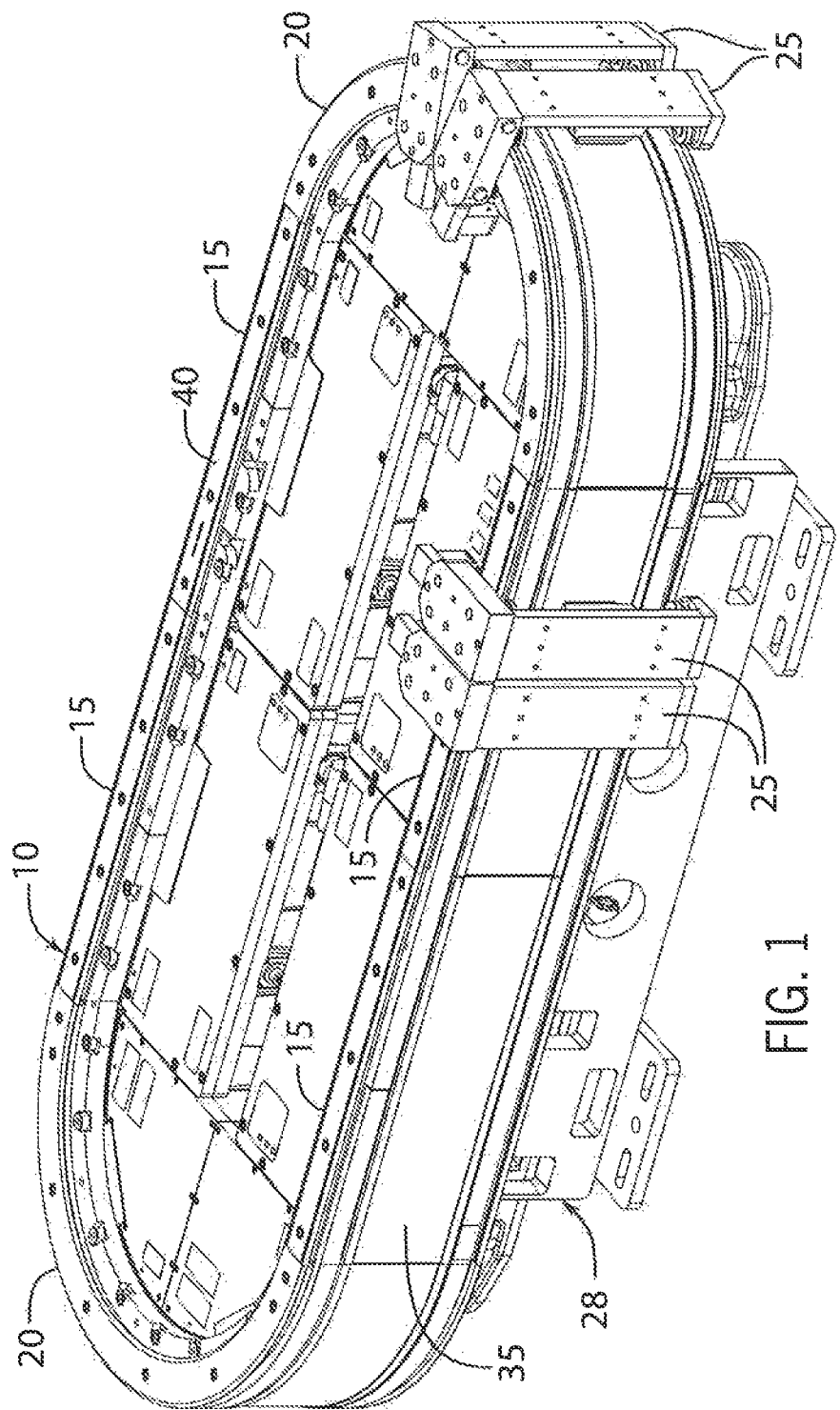
FIG. 1 is an isometric view of an exemplary automated independent cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary automated cart system for moving articles or products includes a track 10 made up of multiple segments 15, 20. According to the illustrated embodiment, the segments (also referred to herein as "track segments") define a closed loop supporting movers 25 movable along the track 10. The track 10 is oriented in a horizontal plane and supported above the ground by a base 28 extending vertically downward from the track 10. The illustrated track 10 includes four straight segments 15, with two straight segments 15 located along each side of the track and spaced apart from the other pair. The track 10 also includes four curved segments 20 where a pair of curved segments 20 is located at each end of the track 10 to connect the pairs of straight segments 15. The four straight segments 15 and the four curved segments 20 form an oval track and define a closed surface over which each of the movers 25 may travel. It is understood that track segments of various sizes, lengths, and shapes may be connected together to form a track 10 and the track may include multiple branches or open-ended segments without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, and various combinations thereof. Further, each track segment 15, 20 is shown in a generally horizontal orientation. The track segments 15, 20 may also be oriented in a generally vertical orientation and the width of the track 10 may be greater in either the horizontal or vertical direction according to application requirements. The movers 25 will travel along the track and take various orientations according to the configuration of the track 10 and the relationships discussed herein. For example, the exemplary construction shown has a transverse drive structure; other structures are possible including a planar drive structure.

Figure 2:
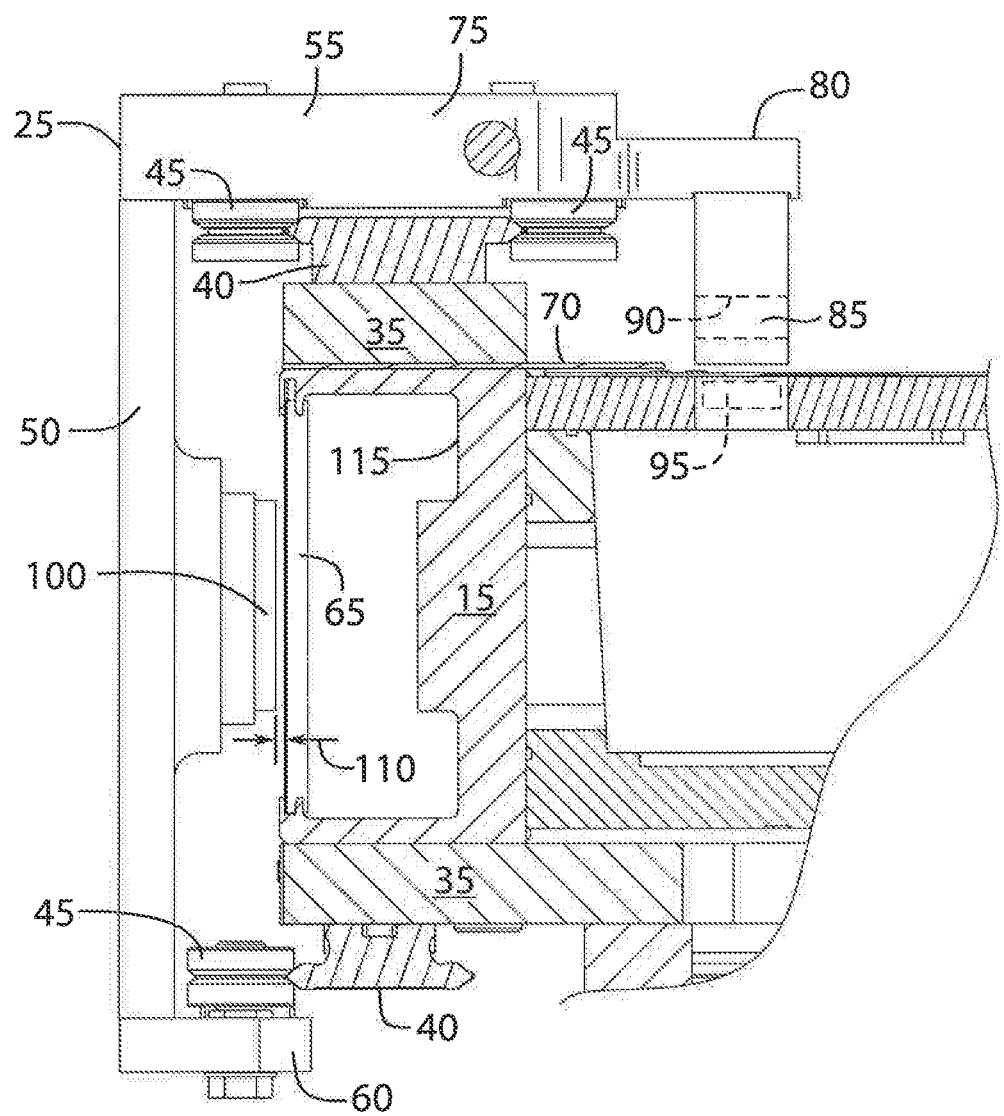
FIG. 2 is a partial sectional view of the cart system of FIG. 1.

With reference also to FIG. 2, each track segment 15, 20 includes a number of independently attached rails on which each mover 25 runs. According to the illustrated embodiment, rails extend generally along the outer periphery of the track segment 15. Each track segment 15 includes a base portion 35 (two base portions 35 are shown in this construction), a channel portion 115, and a rail portion 40 (two rail portions 40 are shown in this construction). Each mover 25 includes complementary rollers 45 to engage the rail portions 40 for movement along the track 10.

Figure 3:
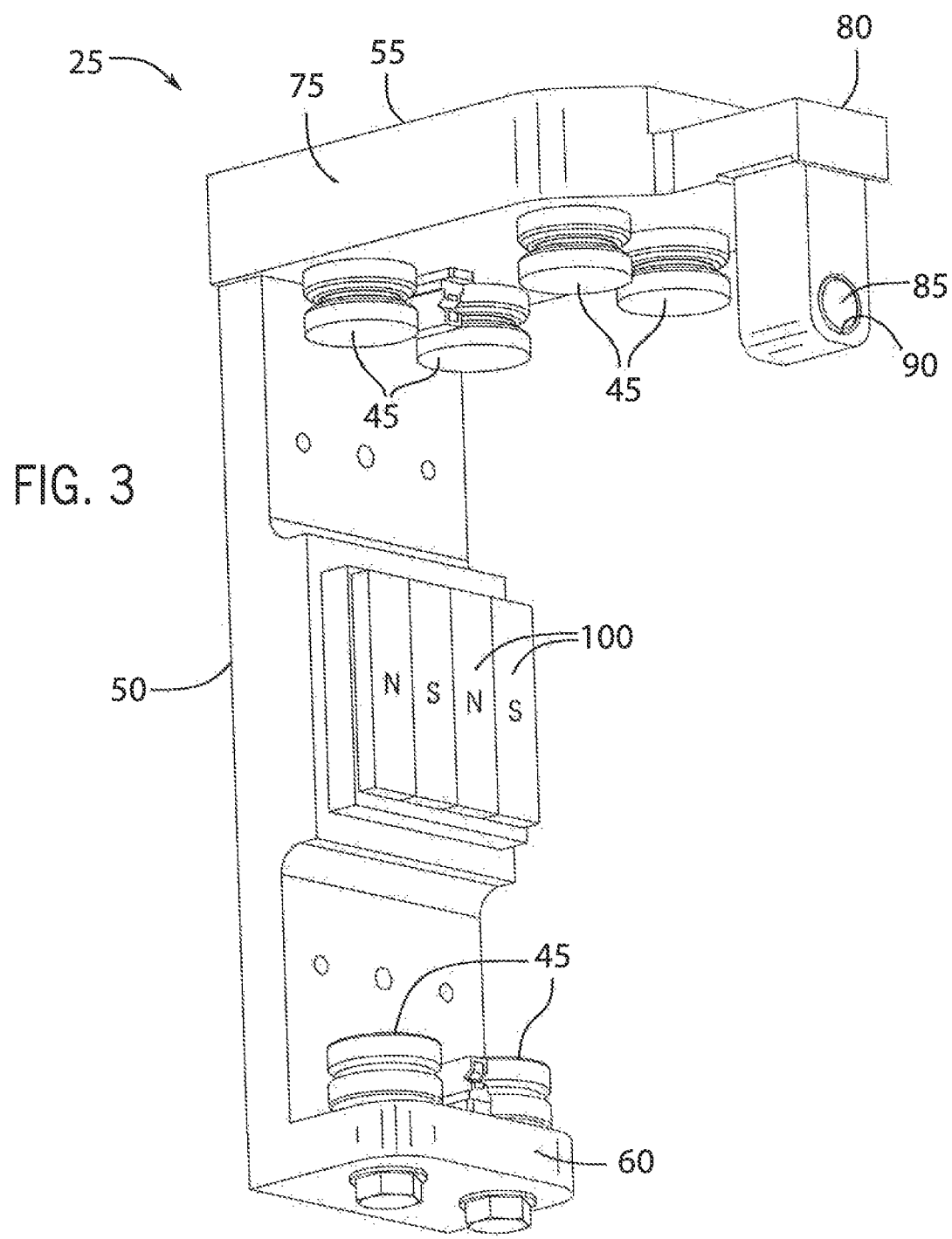
FIG. 3 is an isometric view of a mover from the cart system of FIG. 1.

With reference next to FIG. 3, an exemplary mover 25 is illustrated. Each mover 25 includes a side member 50, a top member 55, and a bottom member 60. The side member 50 is oriented parallel to a side surface 65 (FIG. 2) when the mover 25 is mounted to the track 10. The top member 55 extends orthogonal to the side member 50 at a top end of the side member 50. The top member 55 includes a first segment 75, extending orthogonally from the side member 50. The top member 55 includes a set of rollers 45 that are mounted on the lower side of the first segment 75 and are configured to engage the rail portion 45 mounted to the top surface of the track segment 15. The bottom member 60 extends orthogonal to the side member 50 at a bottom end of the side member 50 and extends for a distance sufficient to receive a third pair of rollers 45 along the bottom of the mover 25. The third pair of rollers 45 engage an outer edge of the rail portion 45 mounted to the lower surface of the track segment 15. Thus, the mover 25 rides along the rails on the rollers 45 mounted to both the top member 55 and the bottom member 60 of each mover 25. The top member 55 also includes a second segment 80 which protrudes from the first segment 75 an additional distance beyond the rail portion 40 and is configured to hold a position magnet 85. According to the illustrated embodiment, the position magnet 85 is mounted within a recess 90 on the second portion 75 and is configured to align with a sensor 95 mounted within the track segment 15.

Figure 4:
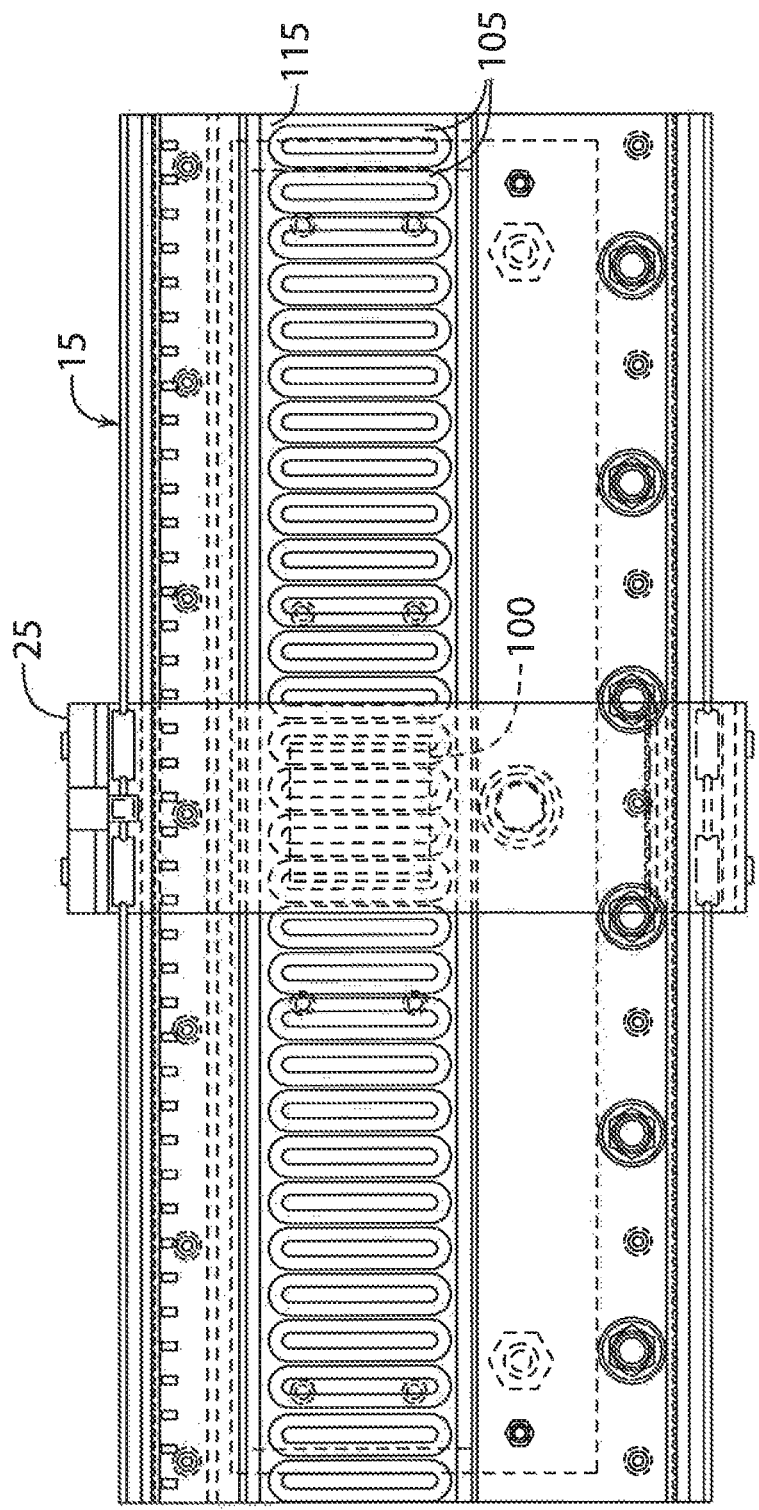
FIG. 4 is a partial side elevation view of one segment of one construction of the cart system of FIG. 1 illustrating activation coils distributed along one surface of the track segment.

A linear drive system is incorporated in part on each mover 25 and in part within each track segment 15, 20 to control motion of each mover 25 along the segment. According to the construction shown in FIG. 4, the linear drive system includes drive magnets 100 mounted to the side member 50. The drive magnets 100 are arranged in a block along an inner surface of the side member 50 with separate magnet segments alternately having a north pole, N, and south pole, S, facing the track segment 15. The drive magnets 100 are typically permanent magnets, and two adjacent magnet segments including a north pole and a south pole may be considered a pole-pair. The drive magnets 100 are mounted on the inner surface of the side member 50 and when mounted to the track 10 are spaced apart from a series of coils 105 extending along the track 10. As shown in FIG. 2, an air gap 110 is provided between each set of drive magnets 100 and the coils 105 along the track 10. On the track 10, the linear drive system includes a series of parallel coils 105 spaced along each track segment 15 as shown in FIG. 4. According to the illustrated embodiment, each coil 105 is placed in a channel 115 extending longitudinally along one surface of the track segment 15. The electromagnetic field generated by each coil 105 spans the air gap 110 and interacts with the drive magnets 100 mounted to the mover 25 to control operation of the mover 25.

Figure 5:
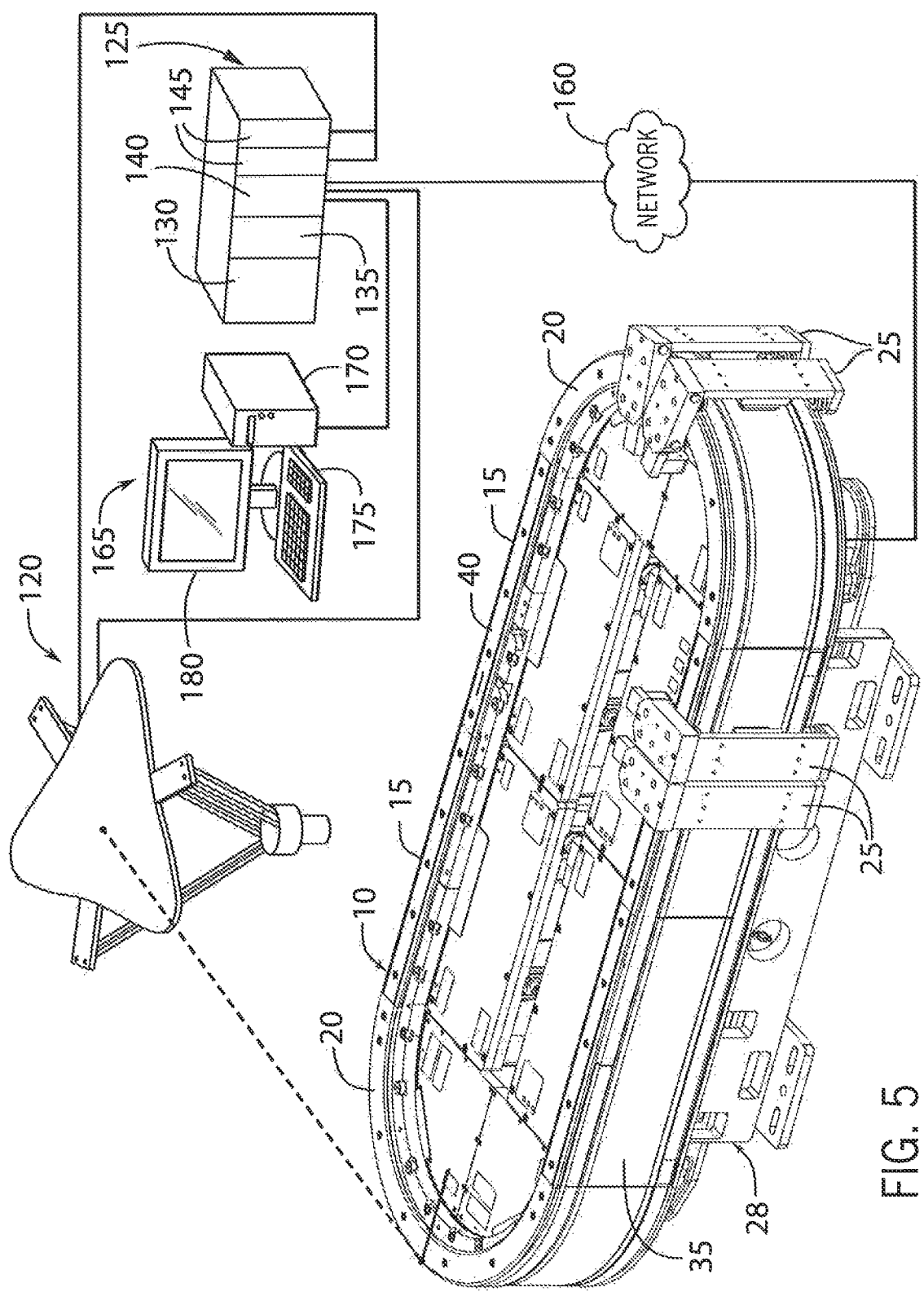
FIG. 5 is an exemplary application environment incorporating the automated independent cart system of FIG. 1 with an external robot operative to engage the transport system.

Turning next to FIG. 5, an exemplary application with a robot (or actuator) 120 which is operative to interact with the movers 25 as they travel along the track 10 is illustrated. An exemplary system controller 125, which may also be referred to herein as a motion controller, controls interaction between the robot 120 and movers 25 travelling along the track 10. The system controller 125 may be an industrial controller, referred to as a Programmable Logic Controller (PLC) or as a Programmable Automation Controller (PAC). The system controller 125 may include a power supply 130, a processor module 135, a communication module 140, and input and/or output (I/O) modules 145. It is contemplated that the system controller 125 may include a single rack or multiple racks of modules. Further, various additional modules may be included according to an application's requirements. A backplane extends between modules within a rack and backplane connectors on each module connect a module to the backplane to receive power and/or for communication between modules. The processor module includes a processor and a memory. It is contemplated that the processor and memory may each be a single electronic device or formed from multiple devices. The processor may be a microprocessor, and the memory may be a non-transitory storage medium. Optionally, the processor and/or the memory may be integrated on a field programmable array (FPGA) or an application specific integrated circuit (ASIC). The memory may include volatile memory, non-volatile memory, or a combination thereof.

The network module 140 facilitates connections to devices, remote racks, and/or other controllers located remotely from the system controller 125. Network medium connect the network module, for example, via an Ethernet connection to a network 160. The connection to the network 160 may be made directly or via a network device, such as a router, a switch, and the like. The network 160 may be an intranet, the Internet, or a combination thereof. The network 160 may be an industrial network such as EtherCAT, Profinet, DeviceNet, Ethernet I/P, ControlNet, and the like, may connect the network module 140 to other devices in the application. The network module 140 is also connected to a user interface 165, which may or may not be via the network 160.

For the construction shown, a set of I/O modules 145 connects the system controller 125 and the robot 120. Each of the I/O modules 145 may connect or disconnect from the backplane through a releasable electrical connector and may provide for one or more releasable terminals such as screw terminals or other electrical connectors allowing interconnection of the I/O modules 145 to conductors communicating with the robot 120.

The user interface 165 is provided for an operator to configure the system controller 125 and to load or configure desired motion profiles for the movers 25 and the robot 120. The motion profiles can include configuration information for the track segments 15, 20, and logical axes (e.g., gains, limits, etc.) for the movers 25. The user interface 165 may include a processing unit 170, an input device 175, including, but not limited to, a keyboard, touchpad, mouse, trackball, or touch screen, and an output device 180, such as a display. It is contemplated that each component of the user interface 165 may be incorporated into a single unit, such as an industrial computer, laptop, or tablet computer. It is contemplated that other combinations of computing devices and peripherals as would be understood in the art may be utilized or incorporated into the system controller 125 and user interface 165 without deviating from the scope of the invention.

Figure 6:
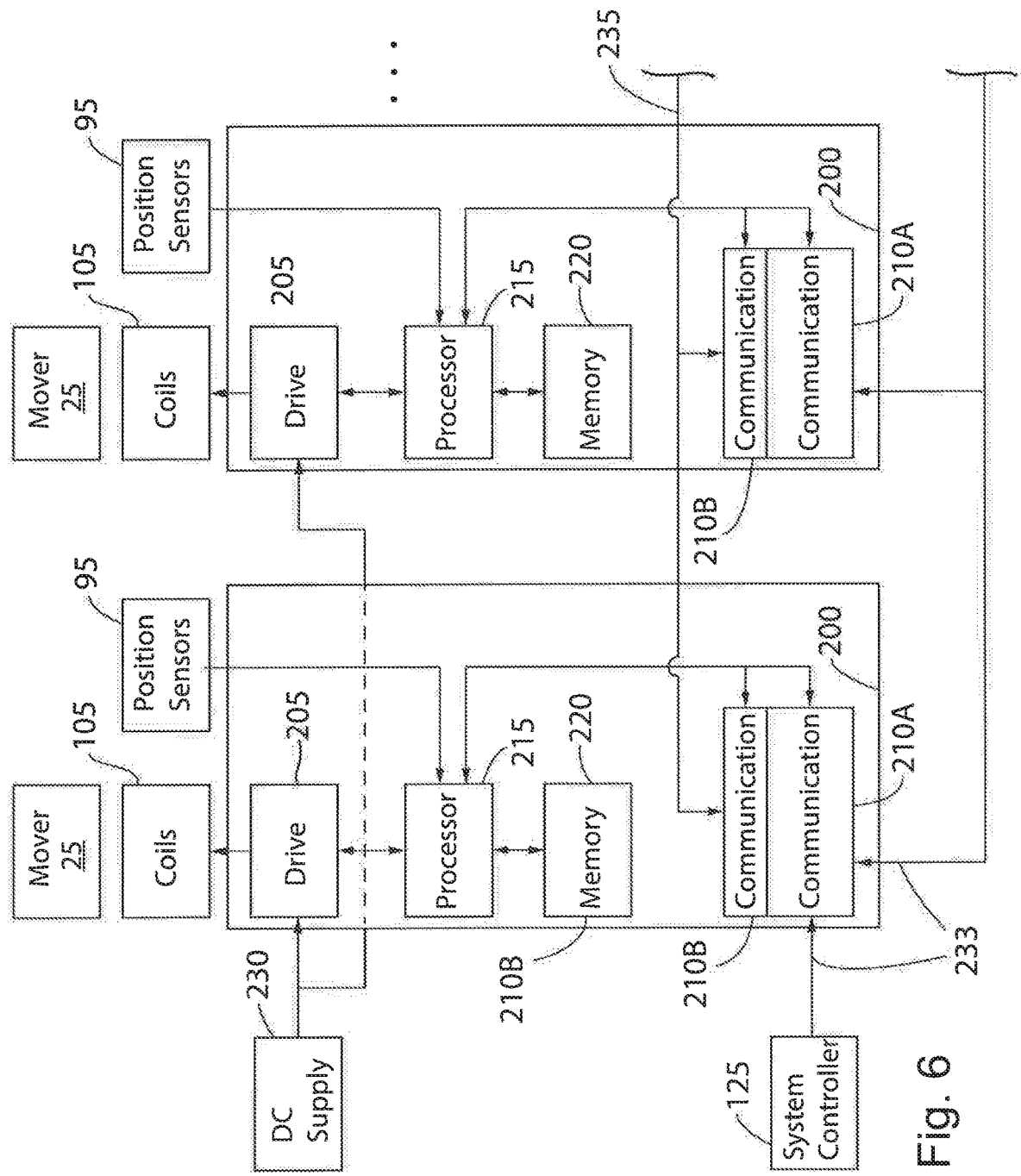
FIG. 6 is a block diagram representation of an exemplary power and control system for the cart system FIG. 1.

Turning next to FIG. 6, an exemplary power and control system for the track 10 and linear drive system is illustrated. A segment controller 200 is mounted within each track segment 15, 20. The segment controller 200 receives force command signals and generates switching signals for the drive 205 which, in turn, control activation of each coil 105. Activation of the coils 105 control and position each of the movers 25 along the track segment 15, 20 according to motion command signals originating from the system controller 125. As will be discussed in more detail below, the motion command signals are provided to one or more defined segment controllers for one or more movers 25, and the force command signals are provided from the defined segment controllers to the segment controller(s) the mover is located on.

Communication circuitry (or module) in each segment controller 200 receives communication from the system controller 125 or other segment controllers 200 and passes the communication to a processor 215 and memory 220 executing in the segment controller 200. The communication circuitry is shown as being in two blocks 210A and 210B. The communication blocks 210A allow for connection to each other for all segments, and is connected to the system controller 125. The connections provide for a frontplane 233. The communication blocks 210B allow for connection to each other for all segments, and is not connected to the system controller 125. The connections provide for a backplane 235. The frontplane 233 and the backplane 235 and what is communicated over each plane will be discussed in more detail below.

The processor 215 may be a microprocessor, and the memory 220 may be a non-transitory storage medium. Optionally, the processor 215 and/or the memory 220 within the segment controller 200 may be integrated on a field programmable array (FPGA) or an application specific integrated circuit (ASIC). It is contemplated that the processor 215 and memory 220 may each be a single electronic device or formed from multiple devices. The memory 220 may include volatile memory, non-volatile memory, or a combination thereof.

According to the illustrated embodiment in FIG. 6, each segment controller 200 generates switching signals to control operation of switching devices within respective drives 205 mounted within the track segment 15, 20. The drive 205 within each track segment 15, 20 are connected between a DC supply 230 and the coils 105. The switching signals are generated to sequentially energize coils 205 along a track segment, where the energized coils 105 create an electromagnetic field that interacts with the drive magnets 100 on a mover 25 to control motion of the movers 25 along the corresponding track segment 15, 20. The switching signals control operation of switching devices in connection with the drive coils 105. The switching devices of the drive 205 may be solid-state devices that are activated by the switching signals, including, but not limited to, transistors, such as insulated-gate bipolar transistors (IGBTs) or metal-oxide semiconductor field-effect transistors (MOSFETs), thyristors, or silicon-controlled rectifiers.

The processor 215 also receives a feedback signal from the position sensors 95 along the track segments 15, 20 to provide an indication of the presence of one or more movers 25. While the position sensors 95 are shown as a single block, it is contemplated that the position sensors 95 typically includes multiple sensors and related conditioning circuitry. In each track segment 15, 20, the processor 215 can generate the switching signals to control the drive 205 to provide power to respective coils 105 for propelling a mover 25 while continuously receiving feedback signals for determining positions of the mover 25. The processor 215 also receives feedback signals from voltage and/or current sensors mounted at an input or output of the track segment 15, 20 providing an indication of the current operating conditions of a DC bus within the track segment 15, 20 or the operating conditions of a coil 50 connected to the track segment 15, 20.

During operation of the automated system, the system controller 125 provides coordinated motion for the system and is operative to generate motion commands for both the movers 25 along the track 10 and an external device, such as the illustrated robot. It is contemplated that the coordinated motion may be, for example, instruction(s) in a control program executing on the system controller 125. For example, the coordinated motion may be two or more instructions in the control program configured to generate motion of a mover 25 and the robot 120 in tandem with each other.

Figure 7:
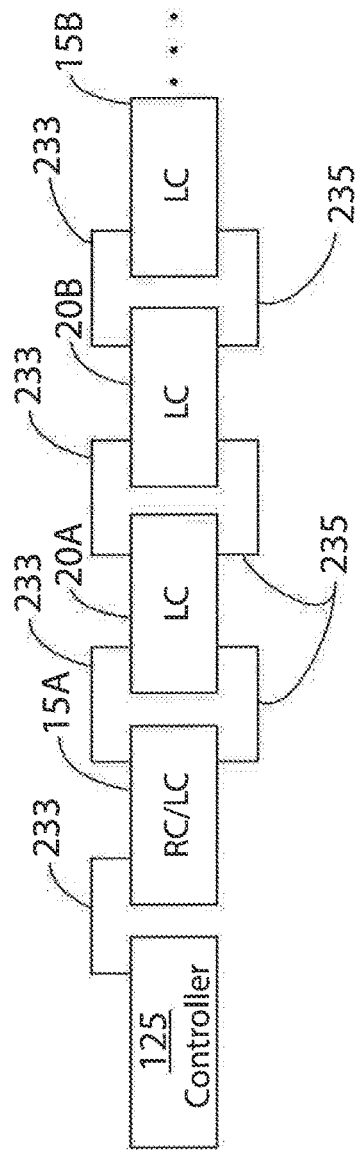
FIG. 7 is a block diagram representation of a system controller and segment controllers in communication.

With reference to FIG. 7, the remote control architecture centralizes motion control responsibilities to one track segment (e.g., 15A) for a specific set of movers. This track segment 15A acts as a quasi-gateway when compared to prior systems. The track segment 15A (remote control "RC" segment) is responsible for motion control for its given mover 25 on an entire track 10 as the movers traverse the entire track. Individual track segments 10, 15 are responsible for managing the dynamic relationship between the movers 25 and the segments 10, 15 upon which they are located. Each track segment 15, 20 (local control "LC" segment) is responsible for force control for all movers 25 located on it. A track segment 15A can be both an RC track segment and an LC track segment. However, track segments 20A, 20B, and 15B are only LC track segments. A track segment 15, 20 requires computational capability as follows: force control based on segment physical capacity (e.g., 8 movers per one track segment in one implementation), and motion control based on track fill requirements, not segment physical capacity (e.g., 4 movers per one track segment).

Before continuing further, it should be understood that the description herein may refer to the RC track segment and the LC track segment as performing a function or operation. In reality, the segment controller 200 causes (e.g., through executing stored instructions) the RC or LC track segment to perform the function or operation.

The backplane 235 is used to distribute force commands from RC segment(s) to LC segments (R2L packets) and collect position feedback from LC to RC segments (L2R packets). An R2L packet refers to a communication packet on the backplane 235 that originates at a remote control track segment, sent to a local control track segments. An L2R packet refers to a communication packet on the backplane 235 that originates at a local control track segment, sent to a remote control track segment. In one implementation, the backplane network communications are synchronized to a servo update rate and the backplane communications run at the servo update rate.

Figure 8:
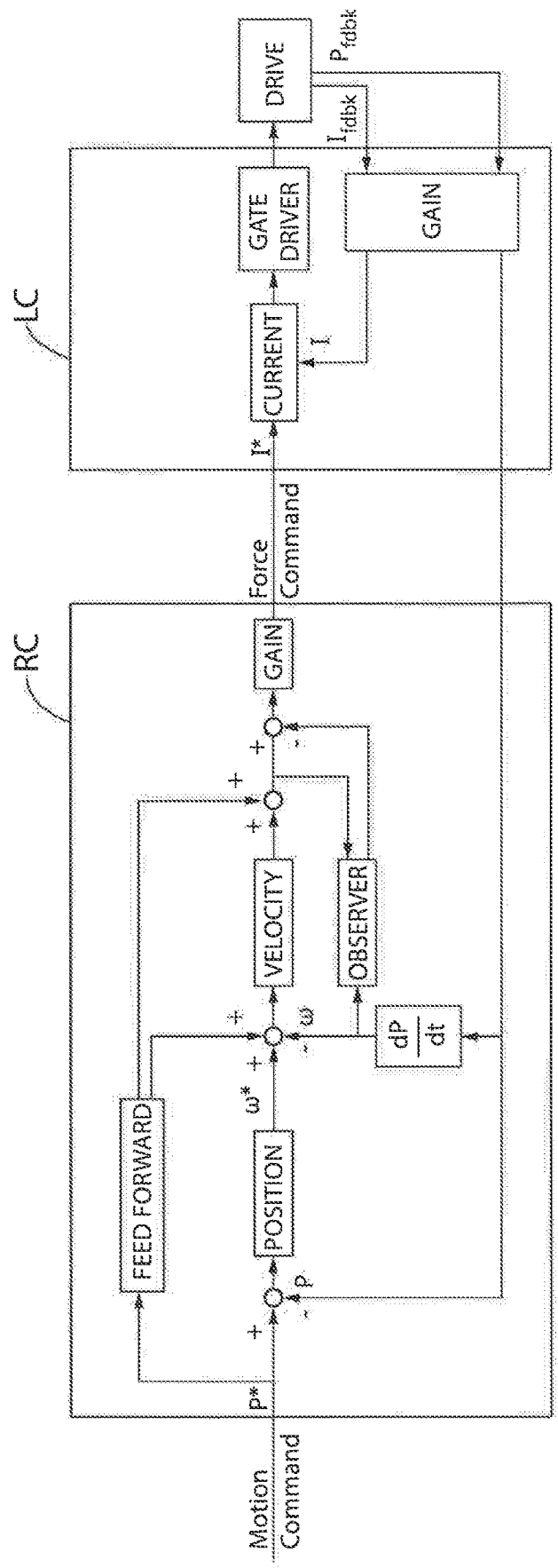
FIG. 8 illustrates the partitioning of motion and force control and the allocation of those functions to segment controllers.

With reference to FIG. 8, motion commands from the system controller 125 are provided to the RC track segment via the frontplane 233. FIG. 8 schematically shows the input to the RC segment as being a position reference signal (P*). The RC track segment includes a number of control loops, or regulators. Each control loop, or regulator, may include one or more controller gains and control paths, and is configured to provide a desired output according to a reference input. According to the implementation illustrated, the RC track segment includes a position control loop, and a velocity control loop. The control loops are shown as cascading control loops where an output of one control loop is provided as an input to another control loop. The RC track segment also includes a feedforward path and a load observer. It is contemplated that various other control topologies may be utilized within the RC segment. The output of the RC track segment is a force command for a mover 25.

Force control includes applying the force command to a mover 25 by determining and applying the necessary current in the appropriate coil(s) 105 that affects force production for that mover 25. FIG. 8 shows the force command being translated to a current reference signal (I*) provided to a current regulator 120. The current regulator 120 uses the current reference signal (I*) and a current feedback signal ($I_{fdbk}$), generated by a current sensors to regulate a current regulator output signal to a desired value. In one embodiment, the current regulator output signal is a voltage reference signal for the gate driver 60 which, in turn, generates the switching signals 31 to the drive section 205. The position feedback device 44 generates the position feedback signal ($P_{fdbk}$) used by the control module.

Accordingly, FIG. 8 provides a simple example of a motion command being provided to an RC track segment, which then provides a force command to an LC track segment. Given that ICT has many carts moving concurrently and may be part of a larger motion system, the actual generating of the motion commands and force commands is likely more complex than is shown. However, the techniques used to generate the motion and force commands can vary depending on the design of the ICS. It is envisioned, though, that motion control includes fine interpolation, position control, velocity control, load observer(s), and/or filtering (low pass, notch, etc.). The output of motion control is a force command for a mover. Force control includes applying the force command to an LC track segment by determining and applying the necessary current in the appropriate coil(s) that affects force production for that mover 25. Force control may also include a current regulator for each coil. A force feedback estimate may be provided which would be calculated by using the coil current feedback and inverse commutation tables.

Figure 9:
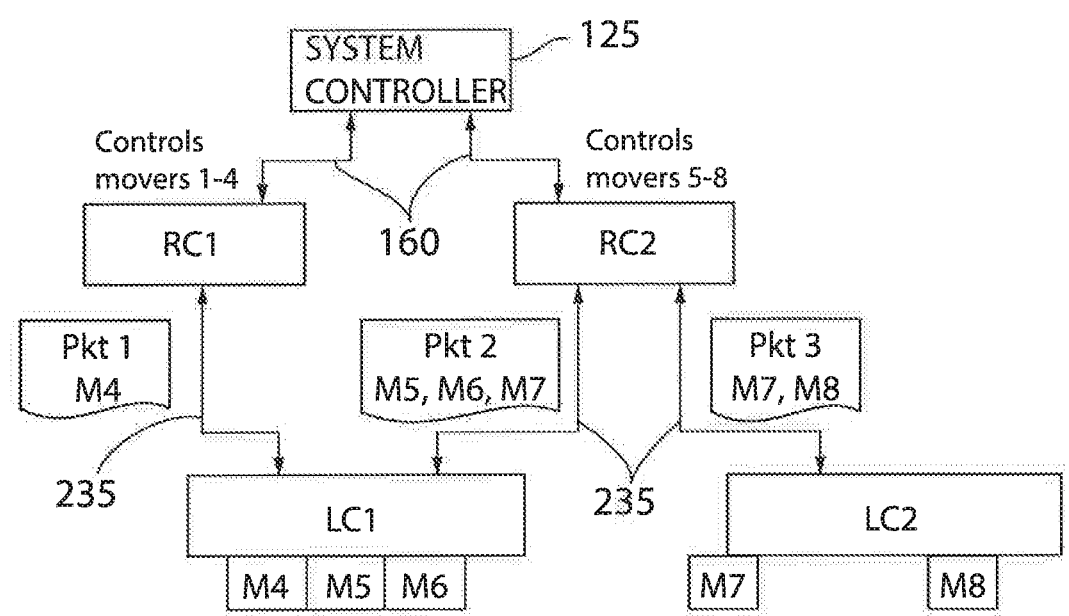
FIG. 9 is a block diagram representation of a system controller, segment controllers, and movers of a track.

FIG. 9 is a snapshot in time for a track having two RC track segments, four LC track segments (only two shown), and eight movers. The figure only shows the RC and LC functions for simplicity. System controller 125 has fixed motion connections to RC1 and RC2. RC1 and RC2 manage gaps between segments by duplicating communications as mover approaches a gap. For example, communication for mover M7 is communicated to both LC1 and LC2. Communication among RC1-RC2 and LC1-LC4 is over the backplane 230. PKT refers to a communication packet from RC1-RC2 to LC1-LC4 or vice-versa.

Servo control has sampling synchronized to the servo loop execution. This implies that the R2L and L2R communications should be synchronized to the servo update period and PWM signal. For a small track implementation (e.g., sixteen or less track segments), servo updates over the entire track and hence, R2L and L2R communications, are concentrated on the backplane.

The track communication architecture can support staggering servo updates, which may increase backplane utilization. Staggering every other RC segment to run one-half servo update period (SUP) increases backplane utilization and can increase track size and/or mover count.

The assignment of movers to RC segment(s) can affect backplane latency. Backplane latency affects track size and mover count. In one implementation, the operator assigns maximum movers per track segment to combine multiple mover data in a single packet. This can result in less packets on the backplane 230. For some backplanes, the backplane is specifically designed as a communication line; i.e., the first and last segments are not communicatively connected. Defining track segments in the middle of the track as RCs reduces the number of hops for R2L and L2R communications, thereby reducing latency.

Figure 10:
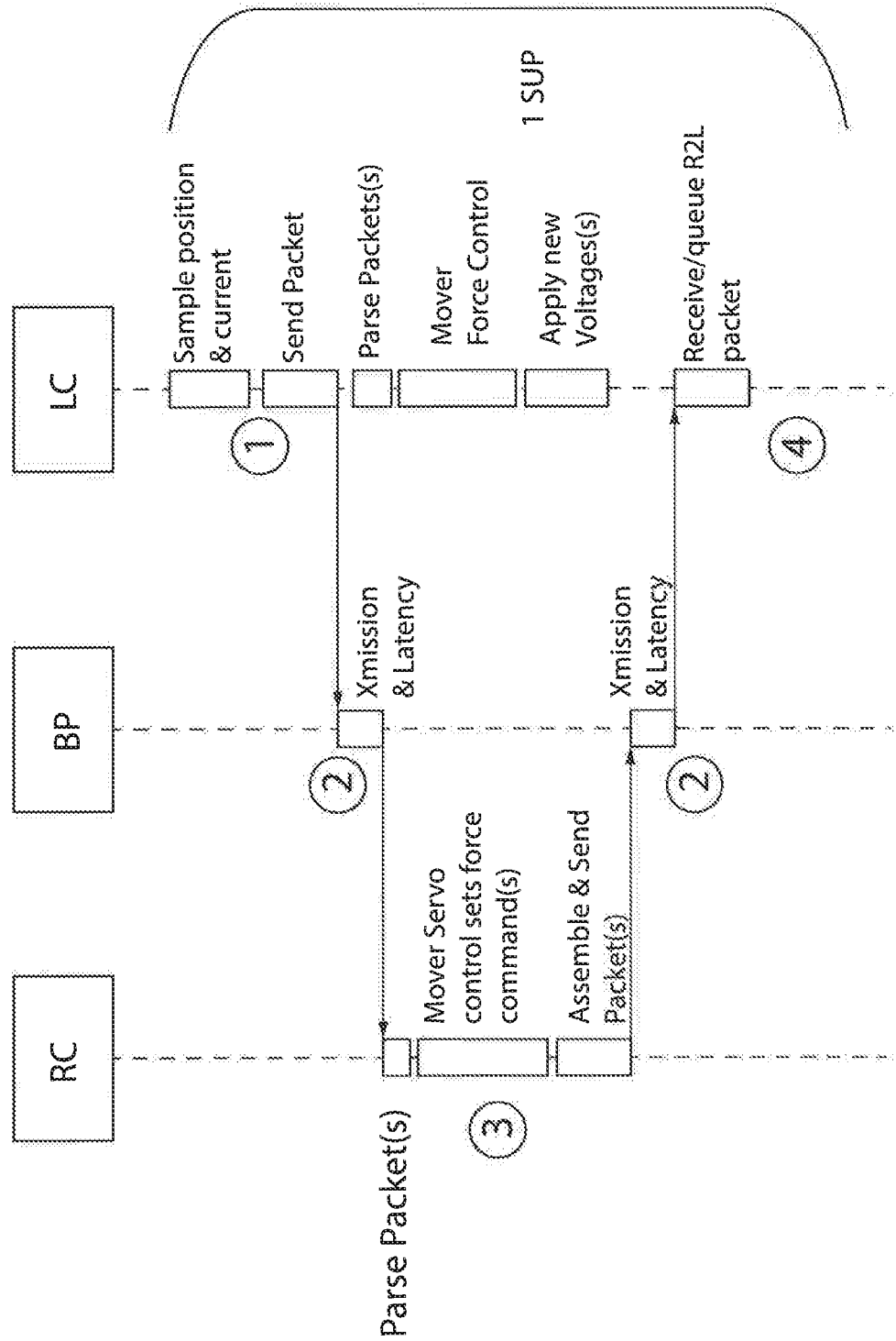
FIG. 10 is a flow diagram representing LC track segment and RC track segment relationships according to one implementation.
Figure 11:
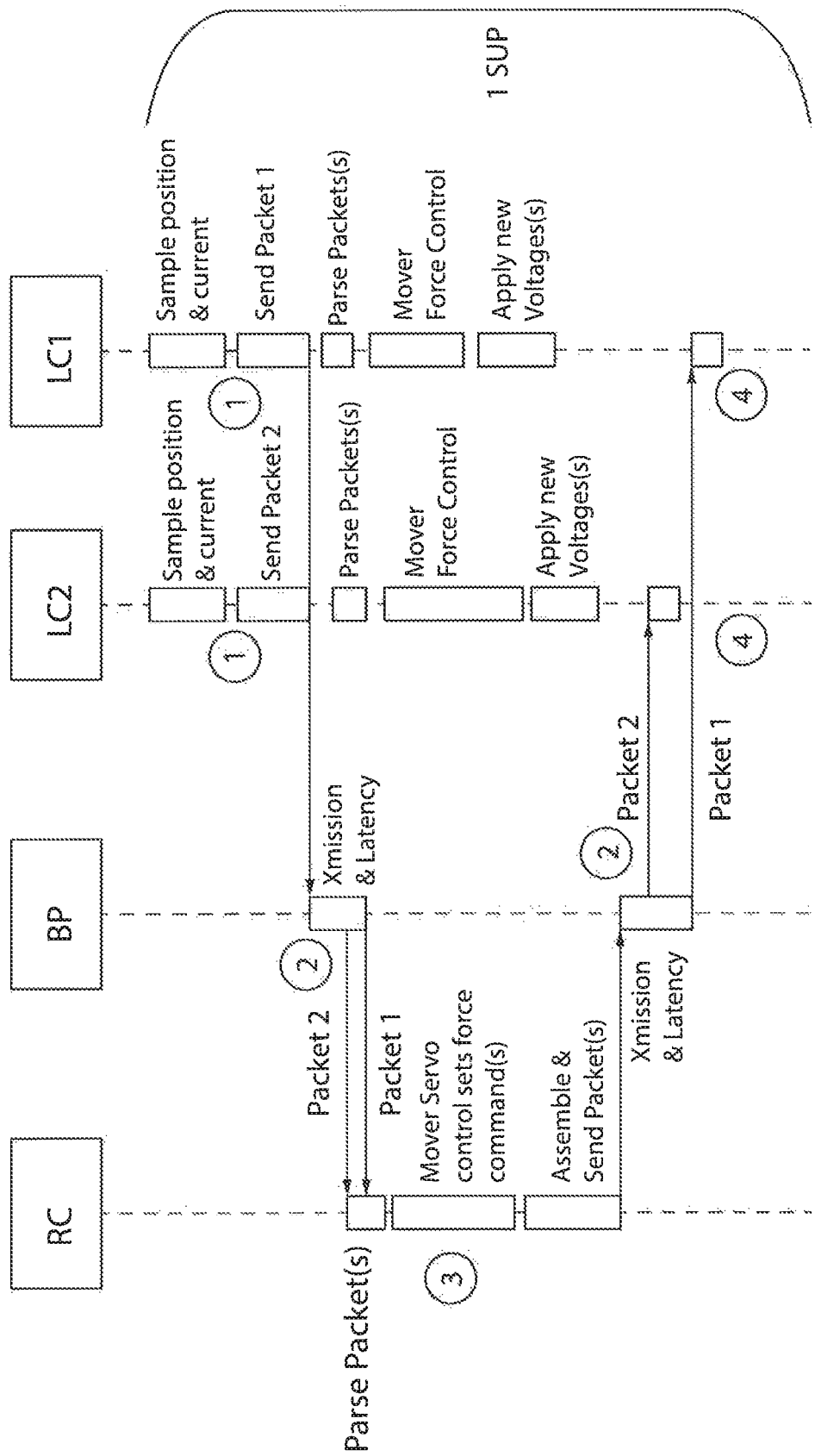
FIG. 11 is a flow diagram representing the relationships between multiple LC track segments and an RC track segment according to another implementation.

The sequence diagrams of FIGS. 10 and 11 illustrate the relationship between remote control and local control segments. The sequence diagrams start with an LC sampling position and current. The diagrams do not show how the RC segment manages the communications. The sequence diagrams also ignore that the RC track segment may also be an LC track segment for simplicity. When the LC track segment is the same track segment as the RC track segment, no external communication is required. The first figure shows a single LC track segment, and the second figure shows two LC track segments. "BP" is the backplane in FIGS. 10 and 11. The entire sequence shown occurs in one servo update period (SUP). The sequence steps are described below.

For step 1, LC track segments sample position and current. Position sampling can occur using time synchronization so that position samples occur at a known time reference with the SUP. RC track segments should know the position sample reference time and not require a time stamp to be sent in the packet. Using a (Common Industrial Protocol) CIP Sync object and a PTP (Precision time protocol) time synchronization enables synchronized sampling on all track segments 15, 20. Another implementation includes sending a single time stamp in a packet corresponding to a specific time reference of the position sampling on the LC track segment. All track segments can have a map of mover IDs and the associated RC track segments perform motion control for each mover 25. An LC track segment assembles an L2R packet of data for each RC track segment associated with the movers' 25 resident on the LC track segment. Each packet includes all data for all movers 25 on the LC track segment controlled by that RC track segment. FIG. 9 illustrates the relationship between movers, LC track segments and RC track segments.

In the example, RC1 is responsible for M1-M4 and RC2 is responsible for movers M5-M8. LC1 has to create a packet for RC1 with M4 data. LC1 also has to create a packet for movers M5, M6 for RC2. All the movers on LC2 are associated with RC2, so LC2 creates a single packet with data for both movers. An exemplary list of data in a packet may include one or more of the following: mover count (number of movers in the packet); mover ID(s); incremental position change(s) (velocity, for motion control); force feedback estimate(s); a limited set of real time read attribute data; LC track segment status (segment fault active, current regulator saturation/limiting, etc.); and a time stamp for position capture.

For step 2, each packet traverses the backplane 230. The time required for packet transmission and receipt is trivial for these examples, but becomes more significant for larger tracks with many packets. A backplane throughput can be a critical design metric to scale up to large tracks.

Upon the LC track segment sending the L2R packet over the backplane 230, the LC track segment parses R2L packets with command information for all the movers that it controls locally. The LC track segment performs commutation, current regulation on each individual coil, and ultimately applies new coil voltages.

For step 3, the RC track segment receives and parses packets for all the movers 25 that it controls. The RC track segment performs motion control for all movers resulting in force commands. The RC track segment can execute the motion control on all axes in succession to optimize cache memory access, so all the mover feedback data should be parsed and ready before unleashing the motion control algorithms. The RC track segment assembles an R2L packet of data for each LC track segment with resident movers that it controls. The packet can include all data for all movers on the LC track segment controlled by that RC track segment. An exemplary list of data in a packet may include one or more of the following: mover count (number of movers in packet); mover ID; force command (Direct force control, or Vreg output); adjacent mover absolute position (commutation angle for mover hand off between LC track segments); adjacent mover velocity (commutation angle advance for mover hand off between LC track segments); and a limited set of real time write attribute data.

For step 4, the LC track segment receives R2L packets with command information for all the movers that it controls locally. The R2L packets are queued for the next SUP cycle.

Figure 12:
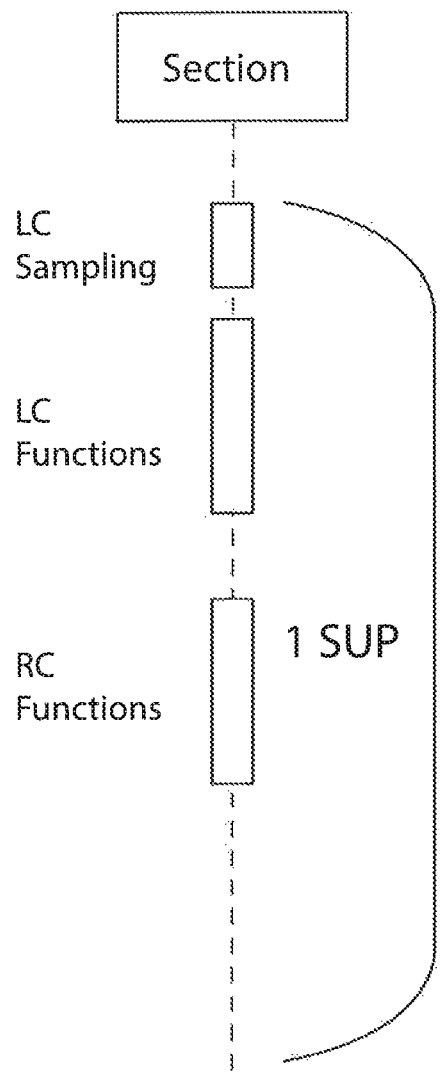
FIG. 12 is a flow diagram representing sequencing of an RC/LC track segment.

FIG. 12 illustrates how a track segment fulfills the roles of RC and LC. The RC and LC functions are time shifted within a SUP and don't overlap.

Realistically, the time spent on the RC/LC functions cannot consume the entire SUP as a track segment has other responsibilities such as Ethernet/CIP stack, Axis State Machine, DC bus control, etc.

A track that is entirely filled with movers is typically not useful. A track fill ratio can be defined as the ratio of the maximum number of movers allowed on a track to the number of movers that can physically fit on a track. An example fill ratio would be 0.5 corresponding to ½ the track being filled with movers. A benefit of the RC architecture is that sections do not have to provide the motion control capacity corresponding to the maximum number of movers that can fit on the section. Each section should be able to perform motion control for a number of movers corresponding to the track fill ratio.

Motion control is evenly distributed across all sections on a track and not concentrated at any section based on the number of movers on that can fit on the section. Each section does have to have the force control capacity corresponding to the maximum number of movers that can be located on the section.

Ideally, servo performance would be identical across the gaps, but this is difficult for at least the following reasons: 1)

the gap creates a discontinuity in the drive coils and feedback system; 2) force control should be managed by the two track segments on each side of the gap; 3) when a mover approaches a new track segment, the new track segment cannot detect position of the mover, but it has to participate in force control; 4) when a mover is close to the gap, both segments detect position, but the detected positions can differ. Remote Control segments are responsible for mover position control, force command generation and communication with local control track segments. Therefore, RC track segments should manage the mover hand off.

FIG. 9 illustrates how an RC track segment would manage mover handoff to a receiving LC track segment. As movers approach segment boundaries, the RC track segment responsible for the mover starts sending mover position and force command to the new LC track segment to which the mover will transition. The RC can determine the segment position to initiate this communication based on the mover speed and segment SUP. Another strategy is to always send position and force data to the adjacent track segment as it will do no harm when the mover is not in a position where the receiving track segment can apply any force. RC track segments should send the position received from one LC track segment (LC2 in this example) to the receiving track segment (LC1 in this example). Receiving LC track segments will get position data that corresponds to the same update as the force command (refer to FIG. 11).

A method to provide centralized motion control for a track based system from the view of a PLC, using a fixed connection between a controller and a single track component (segment). Thus, a method of centralizing motion control responsibility and distributing force control responsibility on track based systems is disclosed. The method provides a single controller interface communication point.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A method of controlling operation of a plurality of movers traveling along an automated independent cart system, the system including a track having a plurality of track segments, each track segment having a respective controller, the method comprising the steps of:
   receiving, at a first controller for a first track segment, a motion command for a first mover, the first mover present on a second track segment;
   receiving, at the first controller, a position feedback corresponding to a location for the first mover along the track;
   determining, at the first controller, a force command for the first mover based on the motion command and the position feedback;
   transmitting the force command from the first controller to a second controller for the second track segment; and
   generating, at the second controller for the second track segment, an excitation field to interact with a linear drive member mounted on the first mover to drive the first mover based on the force command.

2. The method of claim 1, further comprising the steps of:
   receiving, at the first controller, a second motion command for a second mover;
   receiving, at the first controller, a second position feedback corresponding to a second location for the second mover along the track;
   determining a second force command based on the second motion command and the second position feedback; and
   generating a second excitation field to interact with a second linear drive member mounted on the second mover based on the second force command.

3. The method of claim 2, further comprising the steps of:
   receiving, at the second controller for the second track segment, a third motion command for a third mover;
   receiving, at the second controller, a third position feedback corresponding to a third location for the third mover along the track;
   determining a third force command based on the third motion command and the third position feedback; and
   generating a third excitation field to interact with a third linear drive member on the third mover based on the third force command.

4. The method of claim 1, further comprising the steps of:
   communicating the motion command from a system controller distinct from the track to the first controller;
   communicating a second command from the system controller to an actuator distinct from the track, thereby causing an action of the actuator with the excitation of the first mover.

5. The method of claim 1, further comprising the steps of:
   communicating the position feedback from the second track segment having the second controller;
   wherein the received position feedback corresponds to the communicated position feedback.

6. The method of claim 1, wherein generating the excitation field includes identifying one or more coils to energize and causing a current through the identified one or more coils.

7. The method of claim 1, further comprising generating a second excitation field at the first controller to interact with the linear drive member mounted on the first mover in tandem with the excitation field generated at the second controller based on the force command.

8. The method of claim 1, wherein the system further includes a backplane communicatively coupling the respective controllers of the plurality of track segments, and wherein the method further comprises communicating the position feedback and the force command over the backplane.

9. The method of claim 1, further comprising:
   receiving, at the first controller, a plurality of motion commands for a first plurality of movers, respectively, including the first mover:
   receiving, at the first controller, a plurality of position feedbacks corresponding to a plurality of respective locations along the track for the first plurality of movers, the plurality of position feedbacks including the position feedback corresponding to a location for the first mover along the track;
   determining, at the first controller, a plurality of force commands for the plurality of first movers, respectively, based on the plurality of motion commands and the plurality of position feedbacks, the plurality of force commands including the force command for the first mover;

communicating the plurality of force commands to the plurality of controllers based on the position feedbacks; and generating a plurality of excitation fields with the respective controller receiving the force command to interact with the plurality of movers based on the plurality of force commands.

10. The method of claim 9, wherein the first plurality of movers is less than a total number of the plurality of movers on the track.

11. An automated independent cart system, comprising:
a mover including at least one drive magnet;
a first plurality of track segments, each track segment of the first plurality of track segments includes:
a first plurality of drive coils,
a first drive coupled to the first plurality of drive coils, and
a first controller coupled to the first drive, the first controller including a first non-transitory storage medium configured to store a plurality of instructions and a first processor in communication with the first non-transitory storage medium, the first processor being operative to execute the plurality of instructions to selectively control the first drive to energize the first plurality of drive coils for establishing a first electromagnetic field to interact with the at least one drive magnet of the mover;
a second track segment including:
a second plurality of drive coils,
a second drive coupled to the second plurality of drive coils, and
a second controller coupled to the second drive, the second controller including a second non-transitory storage medium configured to store a plurality of instructions and a second processor in communication with the second non-transitory storage medium, the second processor being operative to execute the plurality of instructions to selectively control the second drive to energize the second plurality of drive coils for establishing a second electromagnetic field to interact with the at least one drive magnet of the mover, wherein:
the second processor is further operative to receive a position feedback related to a position of the mover when the mover is located on either the first plurality of track segments or the second track segment,
the second processor is further operative to generate a force command for the mover based on the first position feedback, and
the first controller for each of the first plurality of track segments and the second controller selectively control the corresponding first drive and the second drive, respectively, based on the force command when the mover is located on the corresponding first plurality of track segments or on the second track segment, respectively.

12. The automated independent cart system of claim 11, further comprising:
a second mover including at least one second drive magnet;
a third track segment including
a third plurality of drive coils,
a third drive coupled to the third plurality of drive coils, and
a third controller coupled to the third drive, the third controller including a third non-transitory storage medium configured to store a third plurality of instructions and a third processor in communication with the third non-transitory storage medium, the third processor being operative to execute the third plurality of instructions to selectively control the third drive to energize the third plurality of drive coils for establishing a third electromagnetic field to interact with the at least one drive magnet of the first mover and to interact with the at least one drive magnet of the second mover, wherein:
the third processor is further operative to receive a second position feedback related to a second position of the second mover when the second mover is located on any one of the first plurality of track segments, the second track segment, or the third track segment,
the third processor is further operative to generate a second force command for the second mover based on the second position feedback, and
the first controller for each of the first plurality of track segments, the second controller, and the third controller selectively control the first, second, and third drives based on the second force command when the second mover is located on the corresponding first plurality of track segments, the second track segment, or the third track segment.

13. The automated independent cart system of claim 11, wherein the system further comprises a plurality of movers, each of the plurality of movers having at least one drive magnet, and
wherein the first processor is further operative to execute the plurality of instructions to selectively control the first drive to energize the first plurality of drive coils for establishing electromagnetic fields to interact with the at least one drive magnet of the plurality of movers.

14. The automated independent cart system of claim 13, wherein the second processor is further operative to execute the plurality of instructions to selectively control the second drive to energize the second plurality of drive coils for establishing a second electromagnetic field to interact with the at least one drive magnet of the plurality of movers, wherein the second processor is further operative to receive a position feedback related to a position of each of the plurality of movers and generate a force command corresponding to each of the plurality of movers based on the corresponding position feedback, and wherein the first controllers and the second controller selectively control the first and second drives based on the force commands.

15. The automated independent cart system of claim 11, wherein the system further includes a backplane communicatively coupling the respective controllers of the plurality of track segments, the communicatively coupling includes communicating the position feedback and the force command over the backplane.

16. An automation system comprising:
an actuator;
the automated independent cart system of claim 11;
a motion controller coupled to the actuator and the automated independent cart system, the motion controller operative to generate a motion command and to communicate an actuator command causing an action of the actuator; and
wherein the force command is further based on the motion command.

17. An automated transport system, comprising:
a mover having a drive magnet;
a first track segment including:
- a first plurality of drive coils positioned along a first length of the first track segment,
- a first drive coupled to the first plurality of drive coils, and
- a local control (LC) controller coupled to the first drive, the LC controller selectively controlling the first drive to energize the first plurality of drive coils for establishing a first electromagnetic field to interact with the drive magnet on the mover for moving the mover along the first track segment;

a second track segment including:
- a second plurality of drive coils positioned along a second length of the second track segment,
- a second drive coupled to the second plurality of drive coils, and
- a remote control (RC) controller coupled to the second drive, the RC controller selectively controlling the second drive to energize the second plurality of drive coils for establishing a second electromagnetic field to interact with the drive magnet for moving the mover along the second track segment, wherein:
  - the RC controller receives a position feedback related to a position of the mover on the second track segment and transmits the position feedback to the LC,
  - the LC generates a force command based on the position feedback and transmits the force command to the RC; and
  - the RC controller controls the second drive based on the force command.

18. The automated transport system of claim 17, and further comprising
an actuator;
a motion controller coupled to the actuator and to the LC, the motion controller operative to:
generate a motion command,
transmit the motion command to the LC, and
communicate an actuator command to the actuator, causing an action of the actuator; and
wherein the force command generated in the LC is further based on the motion command.

* * * * *